US007665976B2

(12) United States Patent
Usui et al.

(10) Patent No.: US 7,665,976 B2
(45) Date of Patent: Feb. 23, 2010

(54) HIGH PRESSURE FUEL PUMP FOR INTERNAL COMBUSTION ENGINE

(75) Inventors: Satoshi Usui, Hitachinaka (JP); Hiroyuki Yamada, Hitachinaka (JP); Toru Onose, Ibaraki (JP); Atsuji Saito, Hitachinaka (JP); Masami Abe, Hitachi (JP); Masayoshi Kotaki, Hitachinaka (JP); Hiroshi Odakura, Hitachiota (JP)

(73) Assignees: Hitachi, Ltd., Tokyo (JP); Hitachi Car Engineering Co., Ltd., Hitachinaka-shi (JP)

( * ) Notice: Subject to any disclaimer, the term of this patent is extended or adjusted under 35 U.S.C. 154(b) by 227 days.

(21) Appl. No.: 11/409,062

(22) Filed: Apr. 24, 2006

(65) Prior Publication Data

US 2006/0228239 A1 Oct. 12, 2006

Related U.S. Application Data

(60) Division of application No. 10/614,206, filed on Jul. 8, 2003, now abandoned, which is a continuation of application No. 10/084,386, filed on Feb. 28, 2002, now abandoned.

(30) Foreign Application Priority Data

Jul. 19, 2001 (JP) ............................ 2001-220405

(51) Int. Cl.
*F04B 19/00* (2006.01)
*F16J 1/10* (2006.01)
*F01B 9/00* (2006.01)

(52) U.S. Cl. ............................ 417/470; 92/129; 92/140

(58) Field of Classification Search ................. 417/470; 92/129, 130 R, 140
See application file for complete search history.

(56) References Cited

U.S. PATENT DOCUMENTS 3,595,342 A * 7/1971 O'Leary .................... 184/39.1

(Continued)

FOREIGN PATENT DOCUMENTS

EP 11-82236 A 3/1999

(Continued)

OTHER PUBLICATIONS

European Search Report dated Nov. 5, 2007 (seven (7) pages).
European Search Report dated Nov. 8, 2006 (Five (5) pages).

*Primary Examiner*—Charles G Freay
(74) *Attorney, Agent, or Firm*—Crowell & Moring LLP

(57) ABSTRACT

A high pressure fuel pump for an internal combustion engine having a cylinder, a plunger slidably fitted in the cylinder and a seal mechanism for blocking fuel leakage from an end of a sliding portion between the cylinder and the plunger and also for preventing an lubricant for a driving mechanism of the plunger from entering into the cylinder from the end of the sliding portion of the cylinder and the plunger. A holder surrounding the end of the sliding portion of the cylinder and the plunger is provided. The seal mechanism comprises two mutually independent seal devices mounted with a specific spacing in a longitudinal direction from the end of the sliding portion of the cylinder and the plunger along a circumference of the plunger. The two seal devices are held on the circumference of the plunger by the holder surrounding the end of the sliding portion of the cylinder and the plunger while keeping the specific spacing.

34 Claims, 12 Drawing Sheets

U.S. PATENT DOCUMENTS

| | | | | |
|---|---|---|---|---|
| 5,403,169 | A | | 4/1995 | Yokoi et al. |
| 5,562,294 | A | | 10/1996 | Marsi |
| 5,567,134 | A | * | 10/1996 | Inoue ......................... 417/490 |
| 5,752,430 | A | * | 5/1998 | Kawajiri et al. ............... 92/129 |
| 5,921,166 | A | * | 7/1999 | Machida et al. ............... 92/168 |
| 5,957,674 | A | | 9/1999 | Zenmei et al. |
| 6,135,734 | A | | 10/2000 | Isozumi et al. |
| 6,530,759 | B2 | | 3/2003 | Sano et al. |
| 2004/0052664 | A1 | | 3/2004 | Saito et al. |
| 2004/0164496 | A1 | | 8/2004 | Okada et al. |

FOREIGN PATENT DOCUMENTS

| | | | |
|---|---|---|---|
| EP | 0903490 | A1 | 3/1999 |
| EP | 0976926 | A2 | 2/2000 |
| GB | 2 269 426 | A | 2/1994 |
| JP | 54-67154 | | 5/1979 |
| JP | 62-183165 | | 11/1987 |
| JP | 1-91163 | | 6/1989 |
| JP | 1-98968 | | 7/1989 |
| JP | 5-69200 | | 3/1993 |
| JP | 5-52439 | | 7/1993 |
| JP | 6-24270 | | 3/1994 |
| JP | 6-63965 | | 3/1994 |
| JP | 7-269441 | A | 10/1995 |
| JP | 08-068370 | | 3/1996 |
| JP | 2001-003839 | | 1/2001 |
| JP | 2001-055963 | | 2/2001 |
| JP | 2001-168747 | | 6/2001 |
| JP | 2001-220405 | | 8/2001 |
| JP | 2002-140744 | | 5/2002 |
| WO | WO 02/058870 | A1 | 7/2002 |
| WO | WO 02/099320 | A1 | 12/2002 |

* cited by examiner

HIGH PRESSURE FUEL PUMP FOR INTERNAL COMBUSTION ENGINE

BACKGROUND OF THE INVENTION

The present invention relates to a high pressure fuel pump for force-feeding high pressure fuel to a fuel injection valve of an internal combustion engine.

An apparatus in the past had a rubber seal structure as structure for sealing an outer wall of a plunger to be fluid-tight as disclosed in JP-A-8-68370 specification. In addition, a fuel reservoir formed on a pressurization chamber side of the seal structure was communicated with a passage having pressure equal to atmospheric pressure so as to be opened to the atmospheric pressure.

However, such a high pressure fuel pump in the past requires a clearance of several μm to several tens of μm between a cylinder inner wall and a plunger outer wall for the sake of plunger sliding. Upon fuel injection, if fuel in a fuel pressurization chamber is pressurized, the fuel leaks from the clearance, so that the same pressure as a suction pressure is also applied to the fuel reservoir. In the case of using a rubber lip seal as the seal structure, there was a problem that a limit value of resistance to pressure is too low to withstand the suction pressure, so that seal performance is deteriorated.

In order to solve such a problem, an apparatus according to JP-A-8-68370 specification has the fuel reservoir in communication with to the passage having the pressure equal to atmospheric pressure, but to that end, leaked fuel must be returned to a fuel tank and so piping for tank return must be provided. For that reason, there were problems such as increase in working man-hours and increased costs.

In addition, there was a problem that usable materials are limited due to formability of the lip seal, and seal performance deteriorates since its rigidity is extremely reduced by the fuel including alcohol and so on resulting in little allowance.

An object of the present invention is to provide a high pressure fuel pump for an internal combustion engine of low costs and high reliability implemented to solve the above problems.

BRIEF SUMMARY OF THE INVENTION

According to a first aspect of the present invention, there is provided a high pressure fuel pump for an internal combustion engine having a cylinder, a plunger slidably fitted in the cylinder and a seal mechanism for blocking fuel leakage from an end of a sliding portion between said cylinder and said plunger and also for preventing an lubricant for a driving mechanism of said plunger from entering into said cylinder from said end of the sliding portion of said cylinder and said plunger, wherein: a holder surrounding said end of the sliding portion of said cylinder and said plunger is provided; said seal mechanism comprises two mutually independent seal devices mounted with a specific spacing in a longitudinal direction from said end of the sliding portion of said cylinder and said plunger along a circumference of said plunger; and the two seal devices are held on the circumference of said plunger by said holder surrounding said end of the sliding portion of said cylinder and said plunger while keeping said specific spacing.

This embodiment may further comprise a spacer for regulating said specific spacing mounted between said two seal devices.

In this embodiment, it is preferable that the seal device on said cylinder side, of said two seal devices, has a fuel seal function, and the remaining seal device has a lubricant seal function.

According to a second aspect of the present invention, there is provided a high pressure fuel pump for an internal combustion engine having a cylinder, a plunger slidably fitted in the cylinder, a seal mechanism for blocking fuel leakage from an end of the sliding portion of said cylinder and plunger and also preventing a lubricant for a driving mechanism of said plunger from entering into said cylinder from said end of the sliding portion of said cylinder and said plunger, and a holder having a screw portion for threadedly engaging with a pump body, said cylinder being mounted in said holder and being fixed to the pump body by threadely engaging the holder with the pump body, wherein: said holder has a cover portion for surrounding said sliding portion of the cylinder and plunger; said seal mechanism comprises two mutually independent seal devices mounted with a specific spacing in a longitudinal direction from said end of the sliding portion of said cylinder and said plunger along a circumference of said plunger; and the two seal devices are held on the circumference of said plunger by the cover portion of said holder while keeping the specific spacing.

This embodiment may further comprise a spacer for regulating said specific spacing mounted between said two seal devices.

In this embodiment, it is preferable that the seal device on said cylinder side, of said two seal devices, has a fuel seal function, and the remaining seal device has a lubricant seal function.

According to a third aspect of the present invention, there is provided a high pressure fuel pump for an internal combustion engine comprising a plunger for force-feeding fuel in a pressurization chamber, a suction valve provided at an inlet of the pressurization chamber, a discharge valve provided at an exit of the pressurization chamber, a low pressure chamber provided on an upstream side of the suction valve, a cylinder for slidably holding said plunger, and a seal structures for rendering an outer circumference of said plunger sealed fluid-tight located at two locations at an outside of said cylinder and in an axial direction of said plunger, wherein an annular member made of a resin is used in the seal structure located on said pressurization chamber side, of said seal structures at two locations.

It is preferable that the seal structure on the opposite side to the pressurization chamber, of said seal structures at two locations, is a rubber annular structure.

According to a fourth aspect of the present invention, there is provided a high pressure fuel pump for an internal combustion engine comprising a plunger for force-feeding the fuel in a pressurization chamber, a suction valve provided at an inlet of the pressurization chamber, a discharge valve provided at an exit of the pressurization chamber, a low pressure chamber provided on an upstream side of the suction valve, a cylinder for slidably holding said plunger, and seal structures for rendering an outer circumference of said plunger sealed fluid-tight located at two locations at an outside of said cylinder and in an axial direction of the plunger, wherein there is provided in the cylinder a transverse hole by which the fuel leaked from the pressurization chamber to a fuel reservoir formed on a pressurization chamber side of the seal structures through a clearance between said cylinder and said plunger is returned to an inlet port.

Other objects, features and advantages of the invention will become apparent from the following description of the embodiments of the invention taken in conjunction with the accompanying drawings.

DETAILED DESCRIPTION OF THE INVENTION

Hereinafter, embodiments of the present invention will be described by referring to the accompanied drawings.

Figure 1:
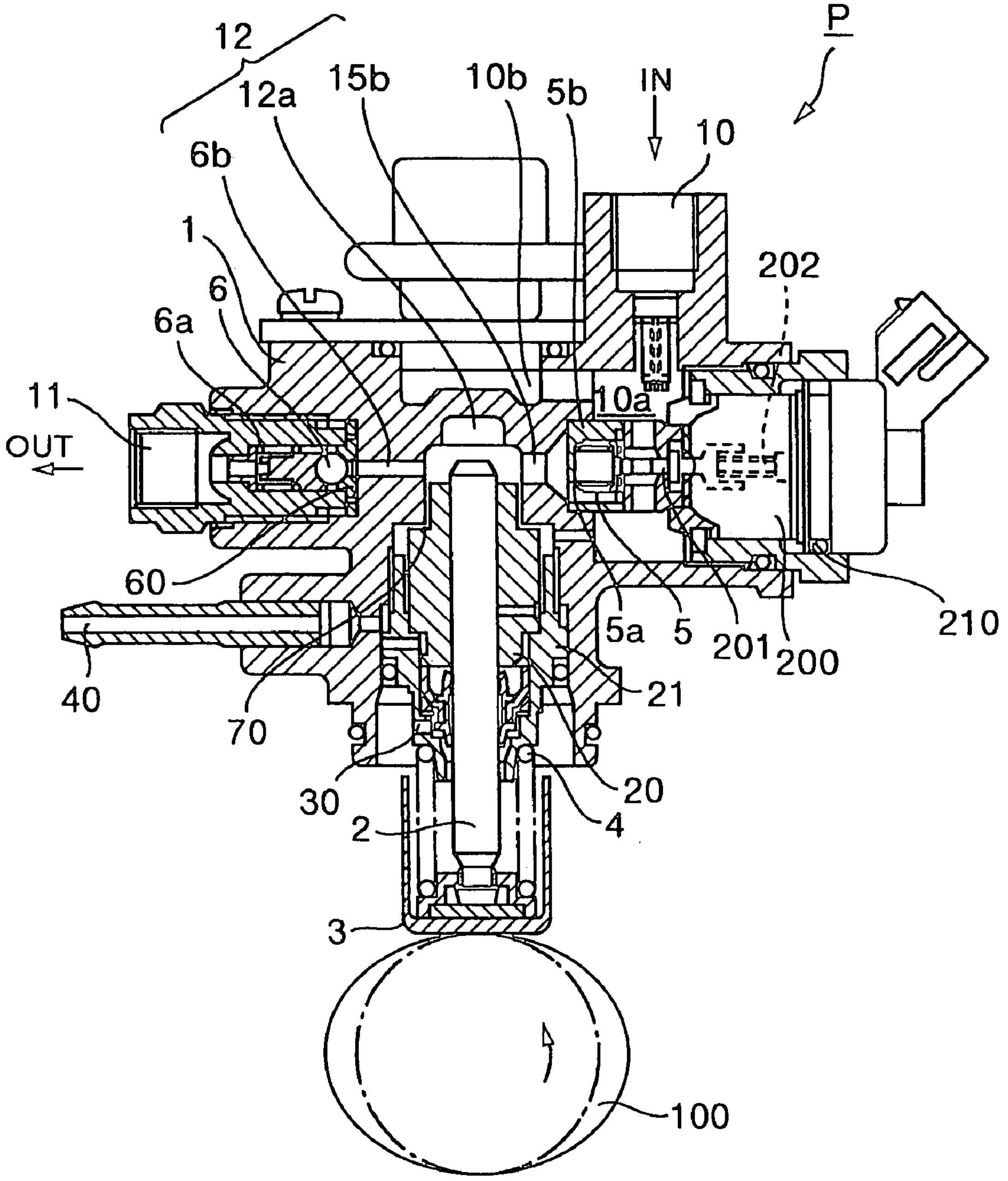
FIG. 1 is a vertical sectional view of a first embodiment of a high pressure fuel pump for an internal combustion engine according to the present invention.
Figure 2:
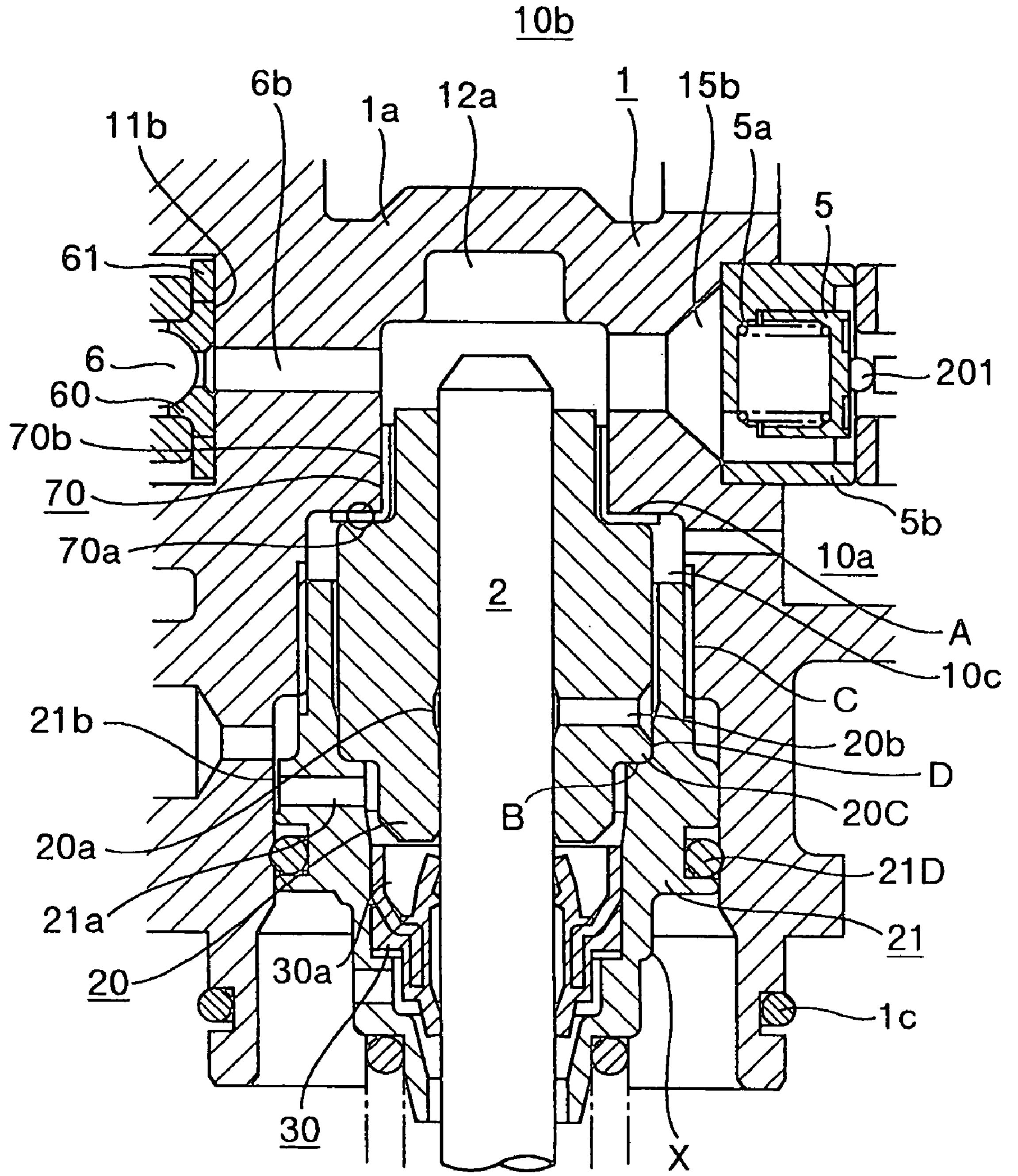
FIG. 2 is a partial enlarged sectional view of the first embodiment shown in FIG. 1.
Figure 3:
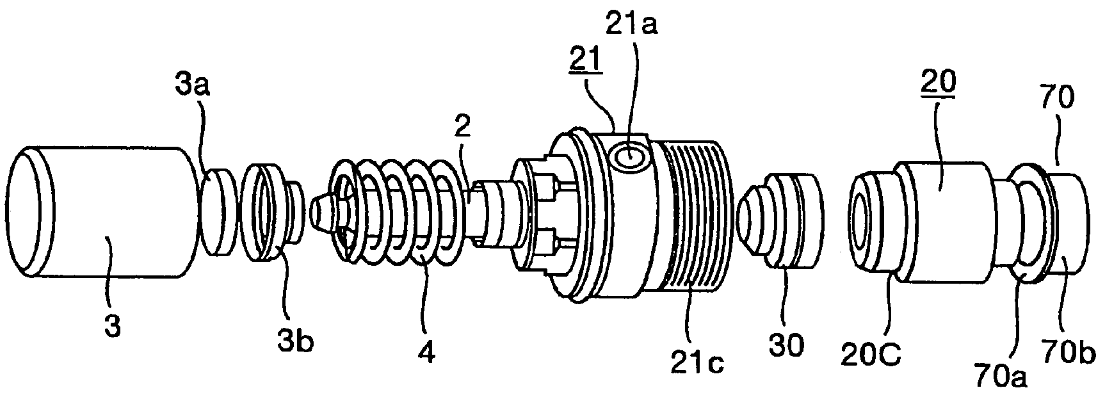
FIG. 3 is an exploded perspective view of a main part of the first embodiment shown in FIGS. 1 and 2.

Basic structure and operation of a high pressure fuel pump for an internal combustion engine according to the present invention will be described by referring to FIGS. 1-4. FIG. 1 is a vertical sectional view of the whole of pump, FIG. 2 is an enlarged view of a main part of the pump, and FIG. 3 is an exploded view of a fuel injection system.

A pump body 1 is formed with a fuel suction passage 10, a discharge passage 11 and a pressurization chamber 12. The fuel suction passage 10 and the discharge passage 11 are respectively provided with a suction valve 5 and a discharge valve 6, which are held in one direction by springs 5*a* and 6*a* to be check valves for limiting a fuel flow direction. The pressurization chamber 12 is formed by a pump chamber 12 to which a plunger 2 as a pressurization member slides, a suction port 15*b* in communication with the suction valve 5 and a discharge port 6*b* in communication with the discharge valve 6.

In addition, in a suction chamber 10*a*, a solenoid 200 is held on the pump body 1 and an engagement member 201 and a spring 202 are arranged on the solenoid 200. The engagement member 201 is biased by the spring 202 in a direction to open the suction valve 5 when the solenoid 200 is off. As the biasing force of the spring 202 is larger than that of a spring 5*a* of the suction valve 5, the suction valve 5 is in an opened state when the solenoid 200 is off as shown in FIGS. 1 and 2. Fuel is led by a low pressure pump 51 from a tank 50 to a fuel inlet of the pump body 1, while it is regulated to be a certain pressure by a pressure regulator 52. Thereafter, it is pressurized at the pump body 1, and is force-fed from a fuel outlet to a common rail 53. The common rail 53 has injectors 54, a relief valve 55 and a pressure sensor 56 mounted thereon. The injectors 54 are mounted according to the number of engine cylinders and inject the fuel in accordance with signals from an engine control unit (ECU) 40. In addition, the relief valve 55 is opened when the pressure inside the common rail 53 exceeds a predetermined value, and prevents damage of a piping system.

The operation will be described below.

A lifter 3 provided at a lower end of the plunger 2 is pressed into contact with a cam 100 by a spring 4. The plunger 2 is slidably held by a cylinder 20, and is reciprocated by the cam 100 rotated by an engine cam shaft and the like so as to change capacity in the pressurization chamber 12.

In addition, a plunger seal 30 is provided beneath the cylinder 20 in order to prevent the fuel from leaking to a cam side.

When the suction valve 5 is closed during a compression process of the plunger 2, the pressure in the pressurization chamber 12 rises and the discharge valve 6 is thereby automatically opened to force-feed the fuel to the common rail 53.

While the suction valve 5 is automatically opened when the pressure in the pressurization chamber 12 becomes lower than that at the fuel inlet, its closing is determined by the operation of the solenoid 200.

When the solenoid 200 maintains an on (current-carrying) state, it generates more electromagnetic force than the biasing force of the spring 202 and draws the engagement member 201 to the solenoid 200 side so that the engagement member 201 and the suction valve 5 are separated. In this state, the suction valve 5 becomes an automatic valve which is opened and closed in synchronization with reciprocation of the plunger 2. Accordingly, during the compression process, the suction valve 5 is closed, and the fuel equivalent to decreased capacity of the pressurization chamber 12 is force-fed to the common rail 53 by pushing the discharge valve 6 open.

In comparison with this, when the solenoid 200 maintains an off (no current-carrying) state, the engagement member 201 is engaged with the suction valve 5 by the biasing force of the spring 202, so that the suction valve 5 is kept in the opened state. Accordingly, even in the compression process, the pressure in the pressurization chamber 12 remains almost as low as that at the fuel inlet, and so the discharge valve 6 cannot be opened, so that the fuel equivalent to decreased capacity of the pressurization chamber 12 is returned to the fuel inlet side through the suction valve 5.

In addition, if the solenoid 200 is turned on in the middle of the compression process, the fuel is force-fed to the common rail 53 from that time. Moreover, once the force-feeding is started, the pressure in the pressurization chamber 12 rises, so that, even if the solenoid 200 is turned off thereafter, the suction valve 5 remains closed and is automatically opened in synchronization with the start of the suction process.

In this pump, the pressurization chamber 12 is formed by pressing a suction valve holder 5*b*, a discharge valve seat 60 and the cylinder 20 into contact with to the pump body 1. While a protector 70 is used in a pressed contact portion between the cylinder 20 and the pump body 1, it is also possible to directly press the cylinder 20 into contact with the pump body 1. Whether or not to use the protector 70 can be selected in accordance with use conditions described later. In addition, it is also possible, for the purpose of obtaining the same effect, to use it for the pressed contact portion between the pump body 1 and the other members than the cylinder 20. Moreover, a suction chamber 10*a* which is a fuel chamber, an annular chamber 10*b* and a fuel chamber 11*b* are provided outside 12 the pressed contact portion of the pressurization chamber.

In general, to seal the pressurization chamber, a seal more expensive than an ordinary constant-pressure seal must be used for the purpose of withstanding pressure fluctuation in the pressurization chamber, whereas by adopting the above structure, a seal may not be used in the pressed contact portion and it is possible to prevent slight fuel leakage from the pressed contact portion leading to fuel leakage outside the pump.

Furthermore, it is possible to improve the seal performance by rendering a member to be pressed into contact with the pump body 1 harder than the pump body 1 to make the member dig into the pump body 1.

In addition, it is possible to improve the seal performance by using a soft material for the pump body 1.

On the other hand, there are the cases where the soft material is eroded (cavitated) and a seal surface gets damaged due to fuel cavitation when higher fuel pressure and higher-speed operation are implemented.

This embodiment uses the protector 70, and has seal surfaces provided at two locations, that is, a seal surface 70*a* (plane) between the cylinder 20 and the pump body 1 and a seal surface 70*b* (cylindrical surface) inside a pump chamber 12*a*. The seal surface 70*a* is pressed into contact with the pump body 1 by screwing a cylinder holder 21. In addition, the seal surface 70*b* is pressed into contact with the pump body 1 by press-fitting the protector 70.

Thereby, it is possible to extend the pressed contact seal surfaces with the pump body 1 of the soft material, so that the period until the seal surfaces are completely penetrated can be prolonged.

In addition, as the seal surface is divided into two as 70*a* and 70*b*, pressure propagation from the pressurization chamber is mitigated in a dividing section so as to prevent erosion of the seal surface 70*a*.

While the protector 70 is placed in the pressed contact portion of the cylinder 20 in this embodiment, it may be placed in any other pressed contact portion.

In addition, a low pressure chamber 10*b* in communication with the inlet chamber 10*a* is provided above the pump chamber 12*a*, which is a part of the pressurization chamber 12, and a wall portion 1*a* between them is the weakest portion of the entire walls of the pressurization chamber 12.

Thereby, in the case where the pressure in the pressurization chamber abnormally rises due to some trouble, this weakest portion gets damaged and high pressure fuel is released to the low pressure chamber, allowing leakage thereof to the outside to be prevented.

In addition, the cylinder 20 is fixed to the pump body 1 by threadably attaching a cylinder holder 21, which is provided outside the cylinder 20, to the pump body 1.

An attaching portion C of the pump body 1 and the cylinder holder 21 is provided between a cylinder-fixing portion A on the pump body side and a cylinder-fixing portion B on the cylinder holder side.

It is thereby possible, even in case of combining the materials of different coefficients of linear expansion, that is, an aluminum material for the pump body 1 and steel for the cylinder 20 (aluminum>steel), to reduce a difference in expansion lengths (expansion length=expanded portion length×coefficient of linear expansion×changed temperature) on the pump body side and the cylinder side generated on a change of temperature because the expanded portion length on the pump body side (portion A to portion C) is shorter than that on the cylinder side (portion A to portion B). Accordingly, there will be neither clearance on a contact surface of the cylinder 20 and the pump body 1 nor deterioration of the seal performance due to reduction in pressed contact force.

In addition, a fitting portion D into which the cylinder 20 is fitted is provided in the cylinder holder 21, and the fitting portion D and an engagement portion C between the cylinder holder 21 and the pump body 1 have different positions on an axis of the cylinder. The engagement portion C is provided closer to an upper opening of the cylinder holder 21 than the fitting portion D. Moreover, the fitting portion D has a slight clearance.

With this, even if the engagement portion C is deformed radially inwardly of the pump body due to thermal expansion of the pump body 1 while keeping the cylinder holder 21 and the cylinder 20 coaxial, rigidity of the engagement portion C on the cylinder holder side is lower than that of the fitting portion D and so the deformation radially and inwardly of the pump body hardly reaches the fitting portion D, so that it prevents tightening of the cylinder 20. Accordingly, it is possible to keep a sliding clearance between the plunger and the cylinder correct so as to prevent galling of the plunger 2 and so on.

In addition, it is possible, by using the material of lower thermal conductivity than the pump body 1 for the cylinder holder 21, to prevent galling of the plunger 2 since heat of the pump body 1 is thereby hardly transferred to the cylinder 20.

Furthermore, it is possible to reduce heat transfer from the pump body 1 by performing resin coating on a threaded portion of the cylinder holder 21.

In addition, an annular chamber 10*c* in communication with the suction chamber 10*a* is provided on a circumference of the cylinder 20.

It is thereby possible to reduce the heat transfer from the pump body 1 to the cylinder 20 and also cool the cylinder 20 with the fuel.

In addition, the plunger seal 30 for sealing the fuel leakage from the plunger 2 sliding portion to the cam side and also sealing entry of oil from the cam side to the plunger sliding portion is held inside the cylinder holder 21.

It is thereby possible, as both of the cylinder 20 and the plunger seal 30 are engaged with the common cylinder holder 21, to keep the plunger seal 30 and the plunger 2 as a sliding material coaxial so as to maintain good seal performance of the plunger sliding portion.

In addition, a plunger seal chamber 30*a* on the inner side of the plunger seal 30 is in communication with the annular chamber 10*c* through a clearance X between the cylinder 20 and the plunger 2, a fuel reservoir 20*a* provided inside the cylinder, and a passage 20*b*. Moreover, the circumference of the cylinder 20 is divided into the annular chamber 10*c* in communication with the suction chamber 10*a* and the plunger seal chamber 30*a* by the fitting portion B.

Moreover, the plunger seal chamber 30*a* is in communication with a return pipe 40 through a communicating hole 21*a* provided in the cylinder holder 21. The return pipe 40 is in communication with the fuel tank 50 in which pressure is approximately atmospheric pressure through return piping (not shown). Accordingly, the plunger seal chamber 30*a* has atmospheric pressure almost equal to the fuel tank pressure since it is in communication with the fuel tank 50 through the return pipe 40.

According to the above-described structure, the fuel leaked from the pressurization chamber 12 through the clearance between the cylinder 20 and the plunger 2 flows into the suction chamber 10*a* from the fuel reservoir 20*a* through the passage 20*b*. On the other hand, low pressure is supplied from the suction chamber 10*a* to the fuel reservoir 20*a*, and so the fuel flows to the plunger seal chamber 30*a* through the clearance X. This fuel flows to the fuel tank 50 through the return pipe 40. At high temperature, however, the fuel is apt to be gasified since the plunger seal chamber 30*a* is almost at the atmospheric pressure.

In this embodiment, a length of the clearance X from the fuel reservoir 20*a* to an opening of the cylinder 20 to the plunger seal 30 is shorter than a reciprocating sliding length of the plunger.

It is thereby possible to secure a fuel oil film at the opening of the cylinder and improve lubricity so as to reduce abrasion, since a portion that is fuel-wetted in the fuel reservoir 20*a* when the plunger 2 is at a top dead center passes through the opening when it is at a bottom dead center.

In addition, a throttle portion 21*b* is provided between the plunger seal chamber 30*a* and the return pipe 40.

It is thereby possible to regulate a fuel amount flowing from the plunger seal chamber 30*a* to the fuel tank 50, so that the fuel more easily remain in the plunger seal chamber 30*a* so as to improve abrasion resistance of the plunger seal 30 and the cylinder opening by fuel lubrication. Especially, it is effective when the plunger seal 30 is higher than the return pipe 40 (upside down in the indicated direction in FIG. 2) when the pump is mounted.

Further, in this embodiment, the solenoid 200 for controlling opening and closing time of the suction valve 5 is held inside the suction chamber 10*a* by a solenoid holder 210, and an annular fuel chamber is formed between the solenoid 200 and the solenoid holder 210.

It is thereby possible to cool the solenoid 200 by the fuel. Alternatively, the annular fuel chamber may be formed on the solenoid circumference without using the solenoid holder.

In addition, it is possible to reduce the transfer from the pump body 1 to the solenoid 200 by providing a screw portion on the circumference of the solenoid holder 210 and engaging it with a housing.

Furthermore, it is possible, by using the material of lower thermal conductivity than that of the pump body 1 for the solenoid holder 210, to prevent burnout of the solenoid 200 since heat of the pump body 1 is thereby hardly transferred to the solenoid 200.

Furthermore, it is possible to reduce the heat transfer from the pump body 1 by performing resin coating on the screw portion of the solenoid holder 210.

Figure 4:
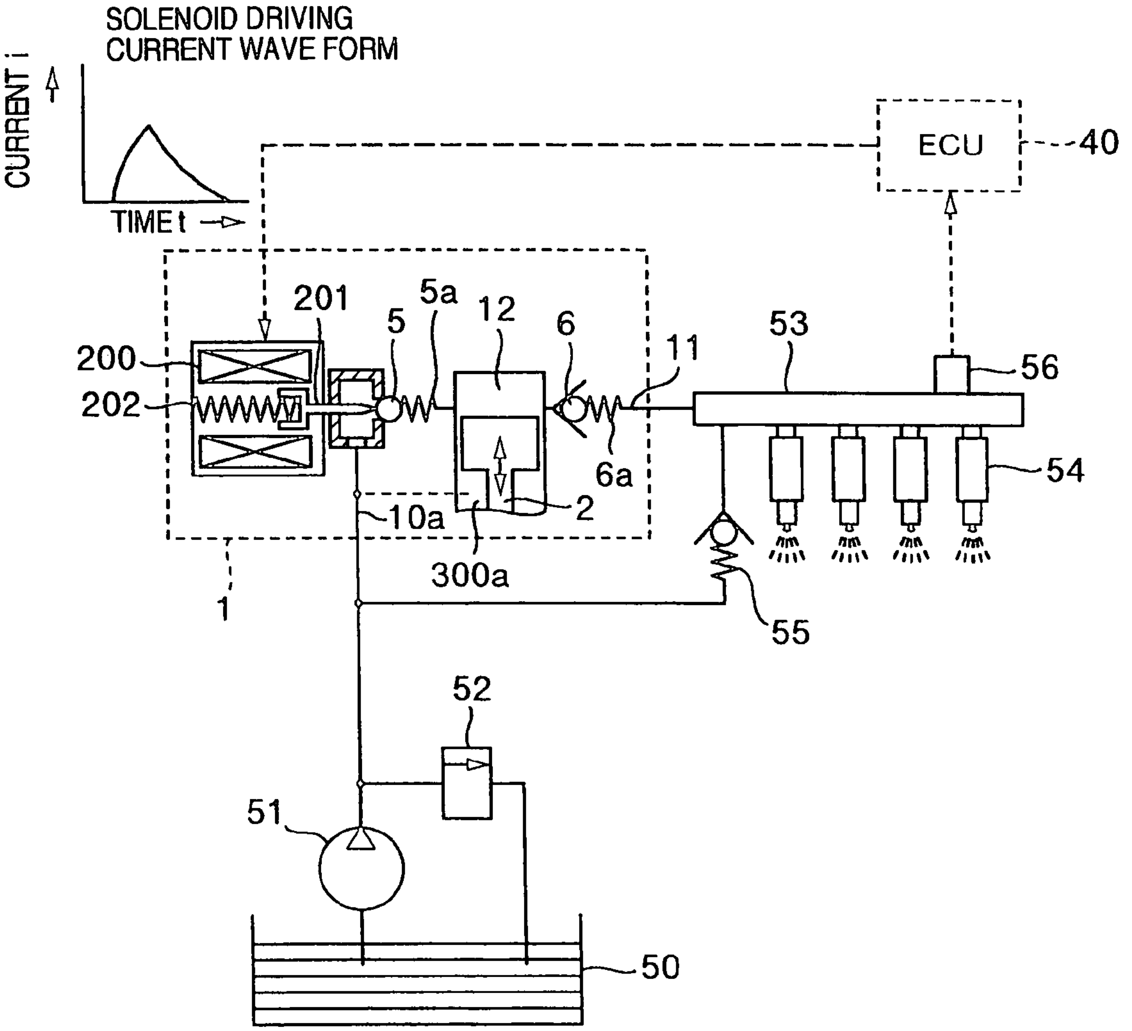
FIG. 4 is a diagram showing a structure of a fuel injection system using the first embodiment.

Moreover, it is possible, by gradually reducing driving currents for the solenoid 200 when it is off as shown in FIG. 4, to reduce collision force when it is off and prevent abrasion and damage of a portion to be collided.

Furthermore, an operating distance of an actuator of the solenoid 200 is rendered shorter according to that of the suction valve 5.

It is thereby possible, even in the case where operating time (response when it is off) of the solenoid 200 is slow, to promptly open the suction valve 5 on a change of pressure in the pressurization chamber (on a shift from the discharge process to the suction process) so as to sufficiently secure opening area of the suction valve 5 and also reduce the collision force by shortening the operating distance of the solenoid 200.

It is thereby possible, as passage resistance on the suction valve 5 is reduced, to prevent reduction in the pressure in the pressurization chamber in the suction process and restrain occurrence of cavitation.

It is also feasible to render the operating distance of the discharge valve 6 shorter than that of the suction valve 5.

It is thereby possible to hold down backflow of the high pressure fuel into the pressurization chamber due to delay in closing the discharge valve 6 (on the shift from the discharge process to the inlet process) to the minimum so as to restrain the occurrence of the cavitation in the pressurization chamber.

Next, other press contacting manners of forming the pressurization chamber will be described by referring to FIGS. 5*a*, 5*b*, 6, 7*a* and 7*b*.

The discharge valve 6 is a ball valve, and comprises a ball holder 63. The ball holder 63 is a cylindrical shape and is slidably fitted in a discharge valve holder 62.

A ball is held by the ball holder 63 upon opening the ball valve 6, and therefore, it is possible to restrain fluctuation of the ball so as to stabilize the fuel flow. Accordingly, it is possible to prevent the cavitation caused by disorder of the flow.

Figure 5A:
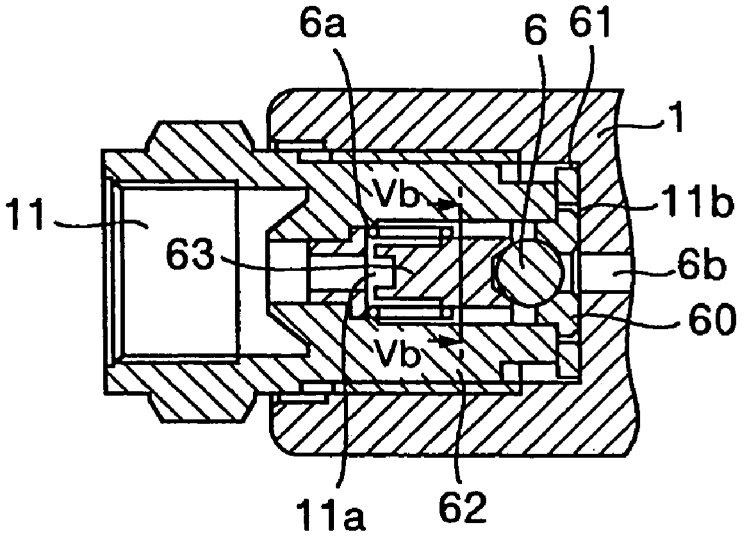
FIG. 5*a* is an enlarged sectional view of a discharge valve unit of the first embodiment.
Figure 5B:
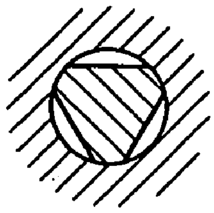
FIG. 5*b* is a sectional view taken along line Vb-Vb in FIG. 5*a;*

In addition, an outer diameter of the ball holder 63 is rendered larger than the ball and cut-out portions are formed on the cylindrical portion as shown in FIG. 5*b*. In this embodiment, three cut-out portions are formed, but the number thereof is not limited to three.

With this structure, it is possible to form an appropriate fuel passage in the ball valve, and therefore, it is possible to prevent the cavitation caused by reduction in the fuel pressure due to pressure loss.

While this structure is not limited to the discharge valve, it is possible to secure oil tightness of high pressure piping with an inexpensive manner by adopting it to the discharge valve as opposed to the case of using a conical valve.

As for the discharge valve shown in FIGS. 5*a* and 5*b*, a discharge valve seat 60 is pressed into contact with the pump body 1 to form the pressurization chamber, and a gasket 61 is placed on the circumference side of the discharge valve seat 60 so as to form the fuel chamber 11*b*. The discharge valve seat 60 and the gasket 61 are pressed into contact with the pump body 1 by screwing the discharge valve holder 62. Accordingly, the pressed contact portions to the pump body 1 to form the pressurization chamber 12 are two locations.

With this structure, it is possible, even if there is slight fuel leakage from a first pressed contact portion located on the pressurization chamber side, to prevent the fuel leakage outside the pump.

Furthermore, it is possible to securely prevent the fuel leakage outside the pump by rendering the gasket 61 less hard than the discharge valve seat 60 and the pump body 1.

In addition, as a second press contact portion is not directly influenced by the pressure fluctuation in the pressurization chamber and the fuel flow, it can have secure seal performance without being involved in the fuel cavitation occurring in the pressurization chamber even if a soft material is used for the gasket 61.

Figure 6:
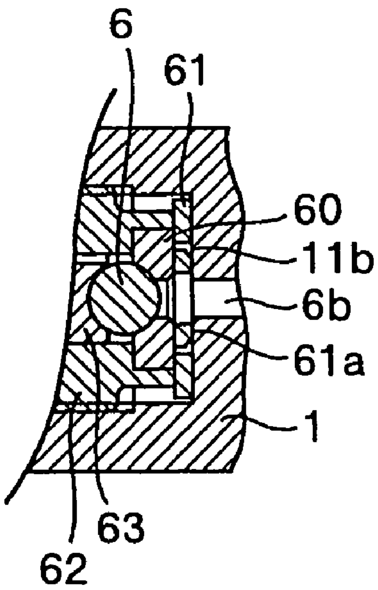
FIG. 6 is a sectional view of another example of the discharge valve unit.

As for the discharge valve shown in FIG. 6, the fuel chamber 11*b* is formed by placing a protector 61*a* between the discharge valve seat 60 and the pump body 1 and, outside thereof, by pressing the gasket 61 of the soft material against both the discharge valve seat 60 and the discharge valve holder 62.

It is thereby possible to securely seal the fuel entering from a discharge chamber 11*a* downstream of the discharge valve 6 to the fuel chamber 11*b*, and therefore, it is possible to improve discharge efficiency of the pump even if there is slight fuel leakage from the first press contact portion on the pressurization chamber side by preventing the backflow of the discharged fuel into the pressurization chamber.

Figure 7A:
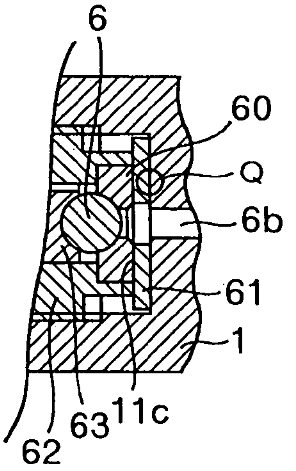
FIG. 7*a* is a sectional view of a further example of the discharge valve unit.
Figure 7B:
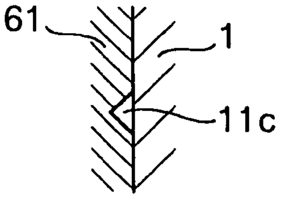
FIG. 7*b* is an enlarged view of a part Q in FIG. 7*a;*

The discharge valve shown in FIGS. 7*a* and 7*b* is an example of the case where no excessive fuel cavitation occurs, wherein one sheet of gasket 61 is pressed against the discharge valve seat 60, the discharge valve holder 62 and the pump body 1. There is a groove 11*c* on a surface of the gasket 61, thereby dividing the press contact surface into two, so that the groove becomes the fuel chamber (or a space chamber).

It is thereby possible, as the pressure propagation from the pressurization chamber is mitigated by the groove 11*c*, to prevent erosion of an outer seal surface of the gasket 61.

While the groove portion is placed on the surface of the gasket in this example, it is also feasible to place it on an opposite surface (a surface of the pump body and so on).

While this example shows the example on a discharge valve seat portion, it is also feasible to apply it to another press contact portion.

Figure 8A:
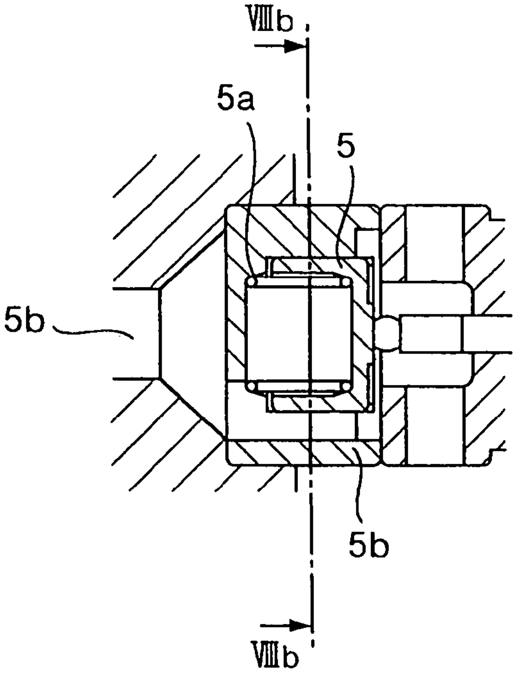
FIG. 8*a* is an enlarged sectional view showing an example of a suction valve unit.

Next, the structure of the suction valve 5 will be described by referring to FIGS. 8*a* and 8*b*.

As for the suction valve in FIG. 8, the suction valve 5 is a flat valve having a cup-like cylindrical portion and the cylindrical portion is slidably received in the suction valve holder 5*b*.

With this structure, the cylindrical portion is held upon opening the flat valve, and therefore, it is possible to restrain fluctuation of a valve body and stabilize the fuel flow. Accordingly, it is possible to prevent the cavitation caused by a disorder of the flow. In addition, it is possible to arrange the spring 5*a* for closing the valve in the cup-like cylindrical portion, so that space can be saved.

Figure 8B:
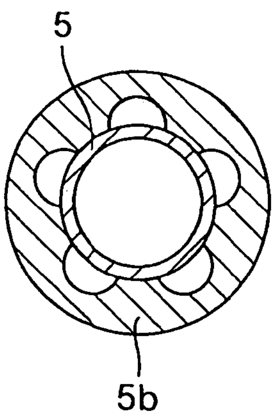
FIG. 8*b* is a sectional view taken along line VIIIb-VIIIb in FIG. 8*a;*

In addition, cut-out portions forming a fuel passage are provided in an inner circumference of the suction valve holder 50 as shown in FIG. 8*b*. Moreover, while it is placed at five locations in this embodiment, the number of the cut-out portions is not limited to five.

With this structure, it is possible to form an appropriate fuel passage the valve mechanism without rendering the cylindrical portion of the valve thicker. Therefore, it is possible to prevent the cavitation caused by the reduction in the fuel pressure due to the pressure loss and render the valve lightweight so as to improve an opening and closing response of the valve.

While this structure is not limited to the suction valve, it is possible to prevent the cavitation caused by the reduction in the fuel pressure because adoption thereof in the suction valve allows higher response on opening the valve and thereby restrain the reduction in the fuel pressure in the pressurization chamber due to delay in valve opening at a start of the suction process.

In addition, in the case of adoption thereof in the discharge valve, it allows the higher response on opening the valve, and it is thereby possible to restrain increase in peak pressure in the pressurization chamber due to the delay in the valve opening at the start of the discharge process.

Next, a second embodiment of the high pressure fuel pump for an internal combustion engine according to the present invention will be described by referring to FIGS. 9, 10, 11 and 12.

Figure 9:
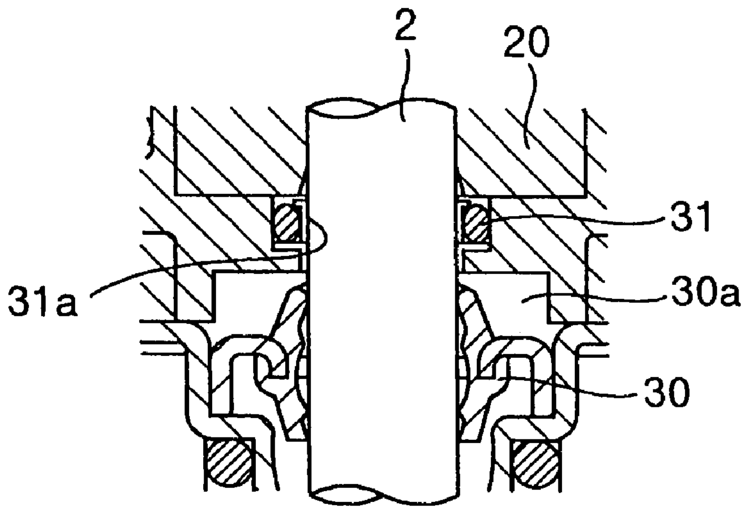
FIG. 9 is a sectional view showing another example of a plunger seal section.
Figure 10:
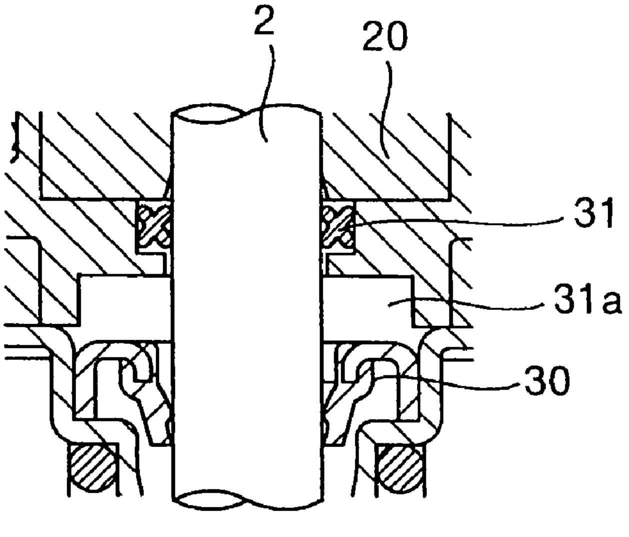
FIG. 10 is a sectional view showing a further example of the plunger seal section.
Figure 11:
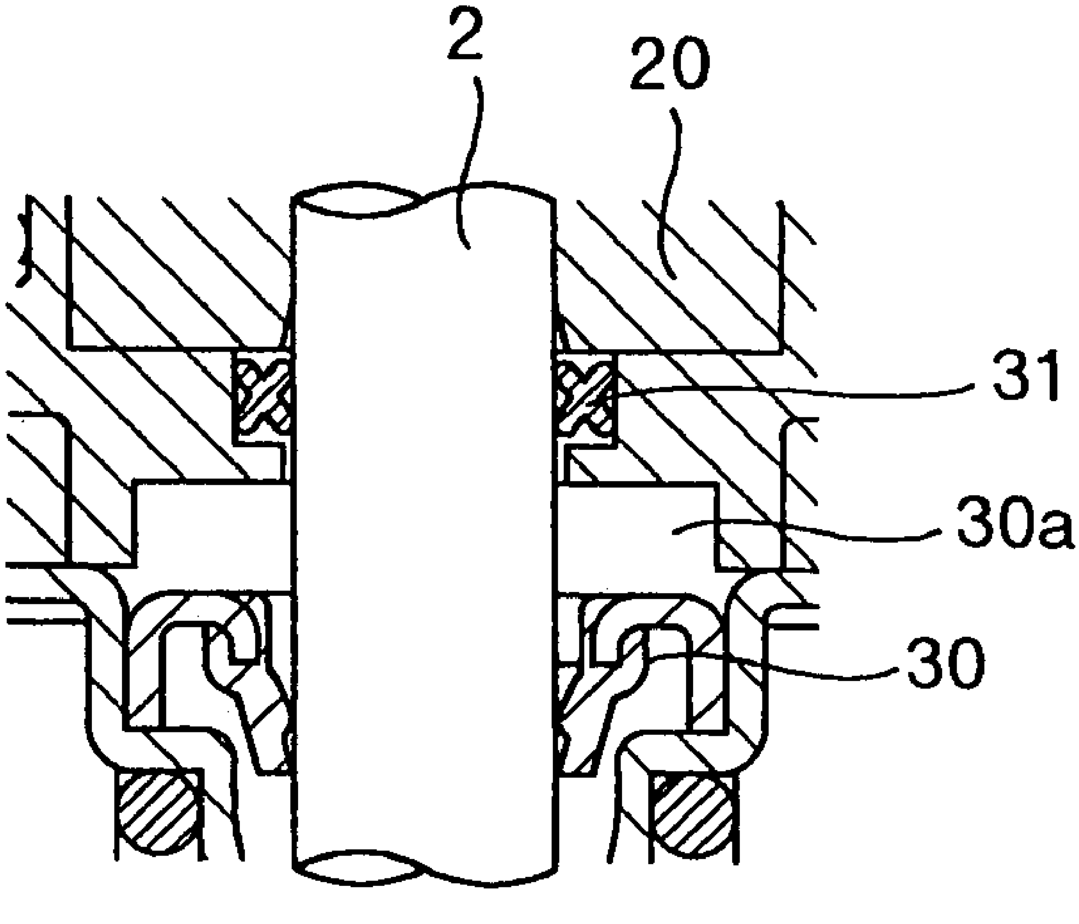
FIG. 11 is a sectional view showing a still further example of the plunger seal section.
Figure 12:
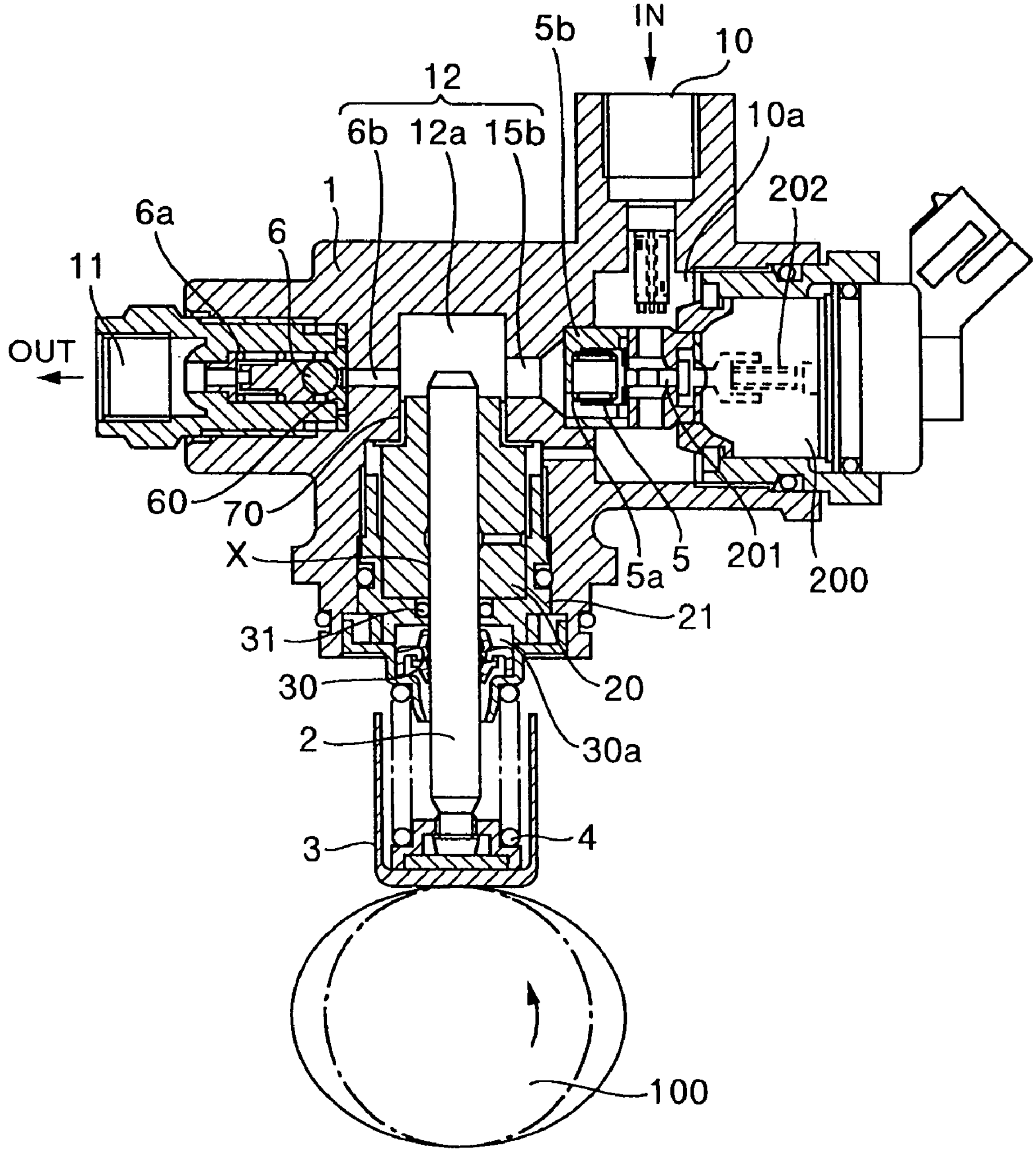
FIG. 12 is a vertical sectional view of a second embodiment of the high pressure fuel pump for an internal combustion engine according to the present invention.

FIG. 12 is a view showing the same section as FIG. 1, and the symbols therein are also the same as those in FIG. 1. FIGS. 9 to 11 are the enlarged views of the plunger seal section in FIG. 12 and showing other examples of plunger seal shapes.

In the second embodiment shown in FIG. 12, the return pipe 40 in communication with the fuel tank 50 and the communicating hole 21*a* are not provided as opposed to the first embodiment shown in FIGS. 1 and 2. In addition, a plurality of seals is provided by adding a ring seal 31 above the plunger seal 30.

With this structure, an inner side of the plunger seal 31 becomes a blind alley only in communication with the opening of the cylinder.

It is thereby possible, as the inner side of the plunger seal 31 is kept at the pressure on the suction side, to prevent gasification of the fuel and keep lubricity so as to improve the abrasion resistance. In addition, even when the pressure in the suction chamber 10*a* pulsates due to the pump operation, the pressure pulsation is attenuated by the sliding portion clearance X between the plunger 2 and the cylinder 20, so that it is not conveyed to the plunger seal 31. Accordingly, it is possible to prevent the damage and abrasion of the plunger seal 31.

In addition, lubricant (oil, grease, etc.) is sealed in the plunger seal chamber 30*a*.

It is thereby possible to improve the abrasion resistance of the seal and also to reduce the fuel leakage from the plunger seal 30 since the fuel in the pump does not come into directly contact with the plunger seal 30.

Moreover, while this second embodiment uses a plurality of plunger seals, it is also effective in the case of using only a lip seal 30 as the plunger seal as in the first embodiment shown in FIG. 1. To be more specific, the inner side of the plunger seal 30 becomes the blind alley only in communication with the opening of the cylinder.

With this structure, the inner side of the plunger seal 30 is kept at the pressure on the suction side, and therefore, it is possible to prevent gasification of the fuel and keep lubricity so as to improve the abrasion resistance. In addition, even when the pressure in the suction chamber 10*a* pulsates due to the pump operation, the pressure pulsation is attenuated by the sliding portion clearance X between the plunger 2 and the cylinder 20, so that it is not conveyed to the plunger seal 30. Accordingly, it is possible to prevent the damage and abrasion of the plunger seal 30.

In addition, a lubricant (oil, grease, etc.) is sealed in the plunger seal chamber 30*a*.

It is thereby possible to improve the abrasion resistance of the seal and also to reduce the fuel leakage from the plunger seal 30 since the fuel in the pump does not come into directly contact with the plunger seal 30.

In addition, as in this second embodiment, it is possible, by adding the ring seal 31 above the plunger seal 30, to improve pressure resistance of the seal which is direct contact with the fuel and alleviate the pressure exerted on the seal located outside of the pump so as to improve reliability of the seal performance.

Alternatively, a plurality of seals of different shapes is placed in the plunger sliding portion, and the seal located outside of the pump is rendered lip-shaped.

The ring seal shapes are the shapes such as an O ring shown in FIG. 12, an O ring having a resin ring 31*a* placed on the sliding side shown in FIG. 9, an X ring shown in FIG. 10, or a K ring shown in FIG. 11.

It is possible, as the ring seals such as O, X and K have better formability than that of the lip seals, to select rubber materials according to the fuel to be used (alcohol, etc.) because of the degree of freedom of material selection.

Figure 13:
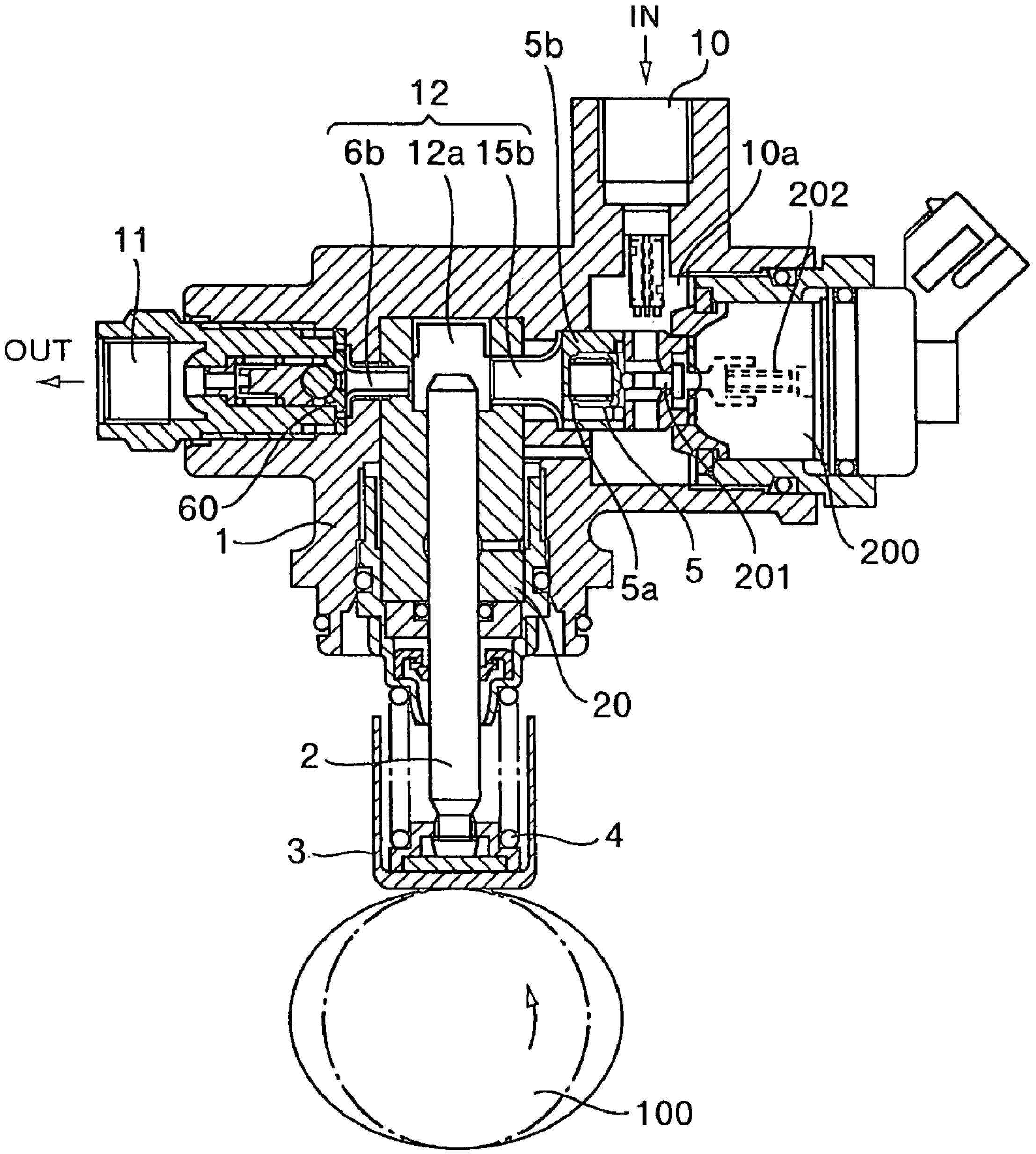
FIG. 13 is a vertical sectional view of a third embodiment of the high pressure fuel pump for an internal combustion engine according to the present invention.
Figure 14:
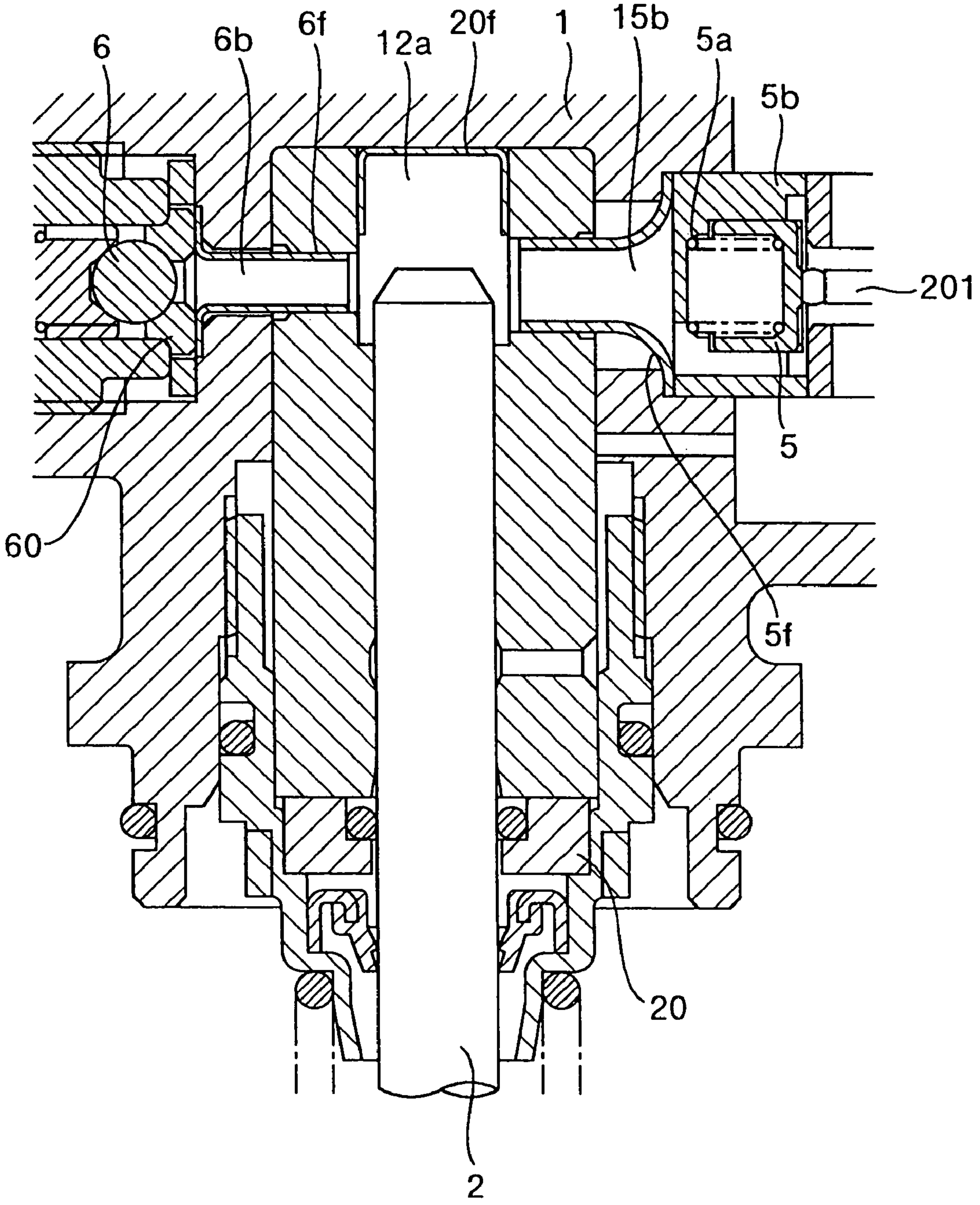
FIG. 14 is a partial enlarged sectional view of the third embodiment.

Next, the structure of a third embodiment of the high pressure fuel pump for an internal combustion engine according to the present invention will be described by referring to FIGS. 13 and 14.

In this third embodiment, the cylinder 20 and the pump body 1 are separate, and the pressurization chamber 12 is not in contact with the pump body 1 but is formed by the suction valve holder 5*b*, the discharge valve seat 60 and cylindrical tubes 5*f*, 6*f* press-fitted in the cylinder 20. Moreover, while the pressurization chamber is formed by a plug 20*f* press-fitted in an upper part of the cylinder 20 in order to improve workability of the cylinder 20, the plug may be integral with the cylinder.

It is thereby possible, even when the cylinder 20 and the suction valve 5 or the discharge valve 6 is positioned apart from each other, to connect them by the cylindrical tubes 5*f*, 6*f* and to deform the cylindrical tubes and to fix them upon assembling, so that variations in dimensions are absorbed. Accordingly, it is feasible to render the entire pump smaller, even in the case where the pump body 1 is not used to the wall of the pressurization chamber 12, because there is a degree of freedom in placement of the suction valve 5 or the discharge valve 6.

In addition, it is possible to absorb the variations in dimensions with the press contact portions of the cylindrical tubes upon assembling.

Furthermore, it is possible to absorb the variations in dimensions in two directions of X and Y by rendering the cylindrical tubes into a flanged-shape and having one side of the press contact portion in a plane surface contact and the other side of the press contact portion in cylindrical surface contact.

The above structure can prevent cavitation damage even in the case of using the soft material such as aluminum for the pump body 1.

In addition, it is possible, even in the case of using the materials of significantly different coefficients of linear expansion for the pump body 1 and the cylinder 20, to prevent the plunger 2 from sticking caused by deformation of a sliding hole of the cylinder due to change of temperature.

Moreover, it is possible, even in the case of using the material of high thermal conductivity for the pump body 1, to prevent the burnout of the solenoid 200 and the galling of the plunger 2.

Accordingly, it is possible, by rendering the pump body all-aluminum, to provide the pump of high reliability that is lower-cost and lighter-weight due to improvement in cuttability.

Figure 15:
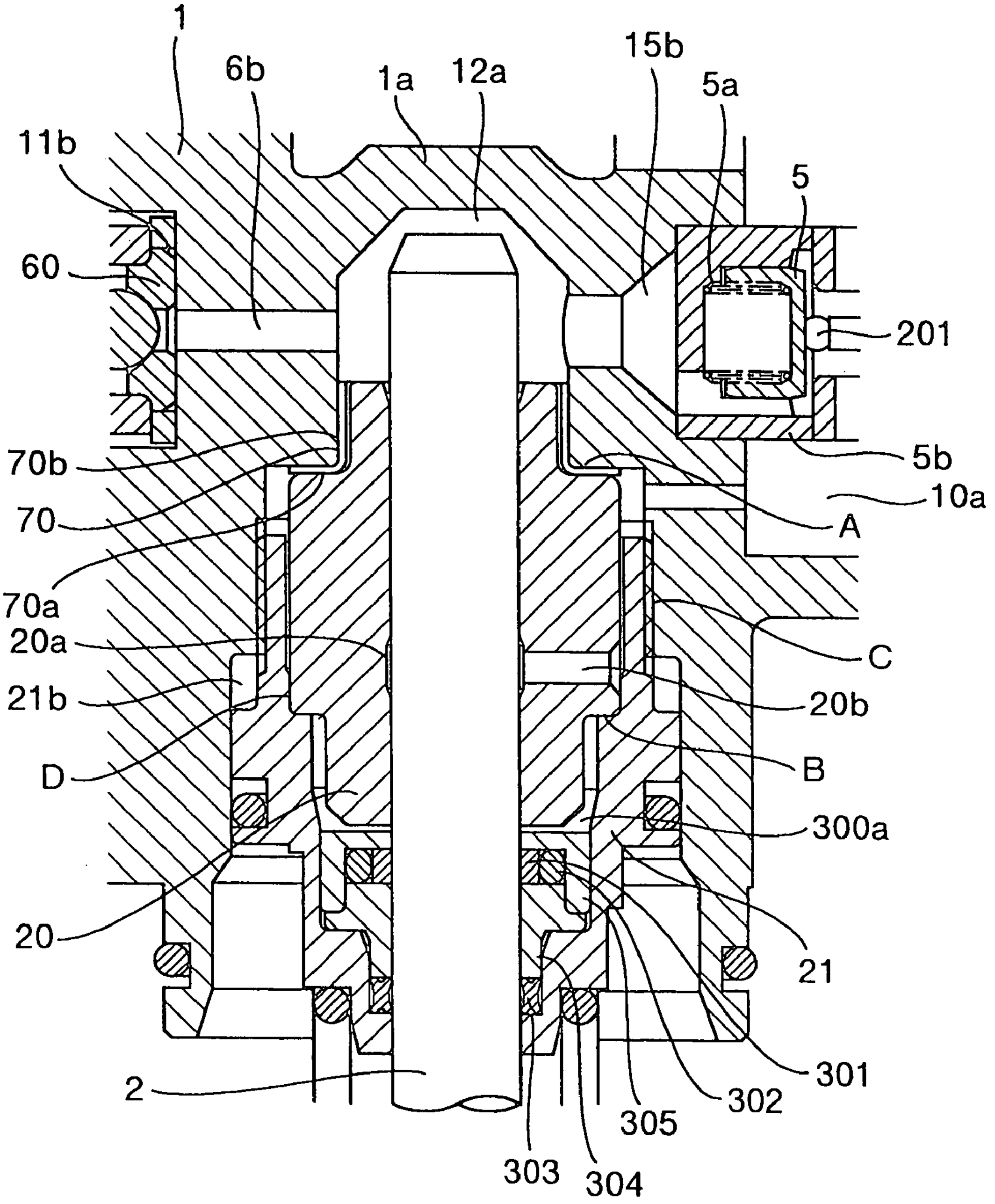
FIG. 15 is a partial enlarged sectional view of a fourth embodiment of the high pressure fuel pump for an internal combustion engine according to the present invention.

A fourth embodiment of the present invention will be described by referring to FIG. 15.

An annular seal member 301 made of resin (Teflon for instance) is used as a gasoline seal structure in order to improve the pressure resistance to the fuel.

An rubber annular seal member 302 is mounted outside the resin annular seal member 301, and they are fixed by being sandwiched by a spacer 304 and a seal holder 305. The rubber annular seal member 302 provides an adequate clamping pressure between the resin annular seal member 301 and the plunger 2, so that good seal performance is obtained.

An X ring 303 made of resin is used as a seal located on the oil side. The X ring is used not only because of the abrasion resistance but because it also has a function of forming a gasoline seal between it and the holder 21 and forming an oil seal between it and the plunger. To be more specific, it has two seal functions formed by one seal. Thus, the seal for the gasoline becomes more effective.

The spacer 304 is made of aluminum, and the seal holder 305 uses an iron metal alloy called SUM 23 in JIS standards.

The spacer has a flange portion formed on its circumference, and the flange portion is sandwiched and fixed by the seal holder 305 and a step portion formed on an inner circumference of the holder 21. A seal effect can also be expected between the spacer 304 and the X ring 303. A seal effect can also be expected between an X ring accepting surface of the holder and the X ring 303.

The seal holder 305 is press-fitted in the holder, and the seal mechanism can thereby be unitized with a bottom portion of the holder to be held. The cylinder 20 is fixed on the pump body 1 by the cylinder holder 21 thus having the seal mechanism mounted, and the plunger is lastly mounted, that is, after applying the grease thereto so that the X ring is not damaged. Thus, assembly workability can be improved.

The gasoline leaked and accumulated in a fuel reservoir 300*a* flows back in the clearance between the cylinder and the plunger to reach a fuel reservoir 20*a*, and is returned to the suction chamber 10*a* from the passage 20*b* (see the broken line in FIG. 4).

A return passage was thereby removed. It is especially effective, from the viewpoints of reducing the man-hours and costs, that the return passage for returning only below 1 cc per minute of leaked gasoline to a gasoline tank is removed.

Hereinafter, the embodiments and advantages of the present invention will be described.

It is possible, by dividing the materials of the first and second press contact portions to use a hard material for the pressurization chamber side and the soft material for the outside, to prevent the first press contact portion from getting damaged by the cavitation and improve the seal performance of the second press contact portion.

Moreover, it is possible, preferably by rendering hardness of the second press contact material softer than that of the housing, to reduce the deformation of the seal surface on the housing side so as to keep good seal performance just by replacing the press contact material upon disassembling and reassembling.

In addition, the pressurization chamber and the low pressure chamber are formed with the same material, and an isolating wall between them has strength that is the weakest in the pressurization chamber.

Thus, if the pressure in the pressurization chamber rises abnormally due to some failure, this weakest portion gets damaged and the high pressure fuel is released to the low pressure chamber so as to prevent the fuel leakage to the outside.

Alternatively, there is the cylinder holder, for fixing the cylinder, of the material different from the housing, where the engagement portion C of the cylinder holder and the housing is provided between the cylinder-fixing portion A on the housing side and the cylinder-fixing portion B on the cylinder holder side.

It is thereby possible, in the case of combining materials of different coefficients of linear expansion, that is, aluminum for the housing and steel for the cylinder, an expansion length on the aluminum side is smaller than that on the cylinder side, so that the expansion length on the aluminum side can be rendered equal to the expansion length on the cylinder side when the temperature is high. Accordingly, there is neither clearance generated on the contact surface of the cylinder and the housing nor deterioration of the seal performance due to reduction in the press contact force.

In addition, it is preferable to fit the cylinder into the cylinder holder and locate this fitting portion and the engagement portion of the cylinder holder and the housing at different positions on the cylinder axis.

It is thereby possible, while keeping the cylinder holder and the cylinder coaxial, to prevent the cylinder holder from deforming radially and inwardly due to expansion of the housing and tightening the cylinder. Accordingly, it is possible to keep the clearance of the sliding portion between the plunger and the cylinder correct so as to prevent the galling of the plunger and so on.

In addition, it is preferable to engage a seal member for sealing the plunger sliding portion with the cylinder holder.

It is thereby possible to keep the cylinder and the seal coaxial and keep the good seal performance of the sliding portion of the plunger.

In addition, it is preferable to place the engagement portion C of the cylinder holder and the housing closer to the opening end of the cylinder holder than the fitting portion D of the cylinder holder and the cylinder.

Thereby, the rigidity of the engagement portion C of the cylinder holder is lower than that of the fitting portion D and so the deformation in the inner diameter direction due to the expansion of the housing hardly reaches the fitting portion D. Accordingly, it is possible to keep the clearance between the plunger and the cylinder correct so as to prevent the galling of the plunger and so on.

In addition, it is preferable to provide the screw portion on the circumference of the cylinder holder and engage it with the housing.

It is thereby possible to securely fix the cylinder by an inexpensive method. In addition, it is possible, by using the material of lower thermal conductivity than the housing for the cylinder holder, to prevent galling of the plunger since the heat of the housing is hardly transferred to the cylinder.

In addition, it is preferable to perform the resin coating on the screw portion.

It is thereby possible to further reduce the heat transfer from the housing.

Alternatively, the annular fuel chamber is formed on the circumference of the cylinder, which chamber is in communication with the low pressure chamber.

It is thereby possible to reduce the heat transfer from the housing to the cylinder and also cool the cylinder with the fuel.

Alternatively, it is feasible to provide the seal on the sliding portion of the plunger and provide the fuel reservoir in communication with the low pressure fuel chamber on the part of the sliding portion between the cylinder and the plunger in communication with the inner side of the seal. In this case, the inner side of the seal is the blind alley only in communication with the cylinder opening.

It is thereby possible, as the inner side of the seal is kept at the pressure on the suction side, to prevent gasification of the fuel and keep lubricity so as to improve the abrasion resistance. In addition, even when the pressure of the low pressure fuel chamber pulsates due to the pump operation, the pressure pulsation is attenuated by the clearance of the sliding portion between the plunger and the cylinder, so that it is not conveyed to the inner side portion of the seal. Accordingly, it is possible to prevent the damage and abrasion of the seal.

In addition, the seal is placed on the sliding portion of the plunger, and the fuel reservoir in communication with the low pressure fuel chamber is provided on the part of the sliding portion between the cylinder and the plunger in communication with the inner side of the seal, wherein the distance from the fuel reservoir to the seal side opening of the cylinder is shorter than the sliding reciprocation length of the plunger.

It is thereby possible, as the portion of the plunger fuel-wetted in the fuel reservoir when at the top dead center passes through the cylinder opening when at the bottom dead center, to secure the oil film at the opening and improve the lubricity so as to reduce abrasion.

Alternatively, the seal is placed on the sliding portion of the plunger, and the pump side of the seal is in communication with the chamber of approximately the atmospheric pressure such as the fuel tank so as to place the throttling portion on a part of the communication passage.

It is thereby possible, by reducing the pressure exerted on the seal and regulating a fuel amount flowing from the seal portion to the atmospheric pressure chamber, to fill the seal portion with the fuel so as to improve the abrasion resistance of the seal and the cylinder opening.

It is especially effective when the seal is located higher than the communication passage. Alternatively, the seal is placed on the sliding portion of the plunger, and the pump side of the seal is sealed with the lubricant (oil, grease, etc.).

It is thereby possible to improve the abrasion resistance of the seal and also to reduce the fuel leakage from the seal portion since the fuel in the pump does not directly come into contact with the seal.

Alternatively, the annular fuel chamber is formed on the circumference of a heat generation portion (solenoid coil portion, etc.) of the actuator for controlling the opening and closing time of the suction valve, and this chamber is in communication with the low pressure chamber.

It is thereby possible to cool the actuator with the fuel.

In addition, it is preferable to provide an actuator holder for fixing the actuator and provide the screw portion on the circumference of the actuator holder so as to engage it with the housing.

It is thereby possible to reduce the heat transfer from the housing to the actuator and also securely fix the cylinder by the inexpensive method. In addition, it is possible, by using the material of lower thermal conductivity than the housing for the actuator holder, to prevent burnout of the actuator since the heat of the housing is hardly transferred.

In addition, it is preferable to perform the resin coating on the screw portion.

It is thereby possible to further reduce the heat transfer from the housing.

Alternatively, a driving power of the actuator for controlling the opening and closing time of the suction valve is gradually reduced when it is off.

It is thereby possible to reduce the collision force when it is off and prevent the abrasion and damage of the colliding portion.

In addition, it is preferable to make a driving portion of the actuator and the suction valve in separate bodies so as to render the operating distance of the actuator driving portion shorter than that of the suction valve.

It is thereby possible, even in the case where the operating time (response when it is off) of the actuator is slow, to open the suction valve on the change of the pressure in the pressurization chamber (on the shift from the discharge process to the suction process).

In addition, it is possible to reduce the collision force by shortening the operating distance of the actuator and also sufficiently secure the opening area of the suction valve.

It is thereby possible, as the passage resistance on the suction valve is reduced, to prevent the reduction in the pressure in the pressurization chamber upon the suction process and restrain the occurrence of the cavitation.

It is also feasible to render the operating distance of the discharge valve equal to or shorter than that of the suction valve.

It is thereby possible to hold down the backflow of the high pressure fuel into the pressurization chamber due to the delay in closing the discharge valve (on the shift from the discharge process to the suction process) to the minimum so as to restrain the occurrence of the cavitation in the pressurization chamber.

Alternatively, at least one of the discharge valve and the suction valve is a ball valve, and there is a cylindrical member fitting this ball valve, and the cylindrical member is rendered slidable in the cylindrical member holder.

It is thereby possible, as the ball is held by the cylindrical member on opening the ball valve, to restrain the deflections of the ball so as to stabilize the fuel flow. Accordingly, it is possible to prevent the cavitation caused by the disorder of the flow.

In addition, it is preferable to render the outer diameter of the cylindrical member larger than the ball valve diameter so as to form a notch at a part of the outer circumference of the cylindrical member.

It is thereby possible, as the appropriate fuel passage can be formed in the valve mechanism, to prevent the cavitation caused by the reduction in the fuel pressure due to the pressure loss.

In addition, it is to secure the oil tightness of the high pressure piping with the inexpensive technique by adopting the above structure to the discharge valve.

Alternatively, at least one of the suction valve and the discharge valve is the flat valve having the cup-like cylindrical portion, and the cylindrical portion is slidably held in the cylindrical portion holding member.

It is thereby possible, as the cylindrical portion is held upon opening of the flat valve, to restrain the deflections of the valve body and stabilize the fuel flow. Accordingly, it is possible to prevent the cavitation caused by the disorder of the flow. In addition, the space can be saved by placing the spring for closing the valve in the cup portion.

In addition, it is preferable to provide the notch forming the fuel passage in a part of the inner circumference of the cylindrical portion holding member.

It is thereby possible, as the appropriate fuel passage can be formed in the valve mechanism without rendering the valve body thicker, to prevent the cavitation caused by the reduction in the fuel pressure due to the pressure loss and render the valve body lightweight so as to improve the response upon opening and closing the valve.

In addition, it is preferable to prevent the cavitation caused by the reduction in the fuel pressure because adoption of the above structure in the suction valve allows higher response upon opening the valve and thereby restrain the reduction in the pressure in the pressurization chamber due to delay in the valve opening at the start of the suction process.

Alternatively, the cylinder and the housing are separated, and the cylindrical tubes are used for a part of the pressurization chamber.

It is thereby possible, even when the cylinder member and the suction valve or the discharge valve are positioned apart from each other, to connect them by the cylindrical tubes and thereby deform the cylindrical tubes and fix them on assembly so as to absorb variations in the dimensions. Accordingly, it is feasible to render the entire pump smaller, even in the case where the housing is not used on the wall of the pressurization chamber, because there is a degree of freedom in the placement of the suction valve or the discharge valve.

In addition, it is preferable to hold the cylindrical tubes by press contact.

It is thereby possible to absorb the variations in the dimensions in the press contact portions upon assembling.

In addition, it is preferable to absorb the variations in the dimensions in the two directions of X and Y by having one side of the press contact portion in the plane contact and the other side in the cylindrical surface contact.

The above structure can prevent the cavitation damage even in case of using the soft material such as aluminum for the housing.

In addition, it is possible, even in case of using the materials of significantly different coefficients of linear expansion for the housing and the cylinder, to prevent the plunger from sticking caused by the deformation of the sliding hole of the cylinder due to the change of temperature.

Moreover, it is possible, even in case of using the material of high thermal conductivity for the housing, to prevent the burnout of the actuator and the galling of the plunger.

Accordingly, it is possible, by rendering the housing all-aluminum, to provide the pump of high reliability that is lower-cost and lighter-weight due to improvement in the cuttability.

Moreover, a plurality of seals of different shapes are placed on the plunger sliding portion.

In addition, it is preferable to render the seal in the pump outer side direction lip-shaped.

Furthermore, the seals in the pump inner side direction have the shapes such as the O ring (including the one having the resin ring and so on placed on the sliding side) or the X/K rings.

It is thereby possible to improve the resistance to pressure of the seal contacting the fuel chamber on the pump inner side and alleviate the pressure exerted on the seal on the pump outer side so as to improve reliability of the seal performance.

In addition, the ring seals such as O, X and K have better formability than the lip seals and so there is a degree of freedom of material selection. Accordingly, it is thereby possible to select the rubber materials according to the fuel to be used.

According to the embodiments, it is possible to provide the high pressure fuel pump which solves the problem when using the soft material such as an aluminum alloy for a pump housing, is highly reliable and has good cutting workability. It is thereby feasible to implement a lower-cost and lighter-weight high pressure fuel supply pump.

Of the seal structures for rendering the outer circumference of the plunger fluid-tight at an outside of the cylinder and at two locations in the axial direction of the plunger, the structure on the pressurization chamber side is the one using an annular member made of a highly rigid resin.

It is thereby possible to secure the resistance to pressure against the fuel and also prevent mixing of the fuel into the oil.

In addition, a rubber annular member is used for the seal structure on the opposite side to the pressurization chamber.

It is thereby possible to prevent mixing of the oil into the fuel and also prevent contamination in the oil from flowing into the pump.

In addition, it should have a mechanism wherein the fuel leaked to the reservoir formed on the pressurization chamber side of the seal structure is returned to a suction port from the pressurization chamber through the clearance between the cylinder and the plunger.

It is thereby possible to omit the piping from the pump to the fuel tank so as to reduce man-hours and costs.

According to the present invention, it is possible, by adding a contrivance to the seal mechanism, to implement the high pressure fuel pump which is low-cost and has the secure seal.

It will be further understood by those skilled in the art that the foregoing description has been made on embodiments of the invention and that various changes and modifications may be made in the invention without departing from the spirit of the invention and scope of the appended claims.

What is claimed is:

1. A high pressure fuel pump, comprising:

a pump housing;

a cylinder fitted to the pump housing;

a plunger slidably fitted in the cylinder;

a seal unit comprised of a first seal configured to prevent fuel leaked from an end of a sliding portion between said cylinder and said plunger from leaking out to atmosphere, a second seal axially spaced along said plunger from said first seal to prevent a lubricant oil for a driving mechanism of said plunger from entering into said cylinder from said end of the sliding portion of said cylinder and said plunger and a seal holder for said first and second seals;

a holder configured to hold the seal unit around the plunger and provided with a stepped seal holding portion for fixing said seal holder therein, wherein an outer circumference of said holder is fixed to an inner circumference of said pump housing, and said seal unit is held between an inner circumference of said holder and said plunger and between said seal holder and said stepped seal holding portion so as to constitute a unit, and an outer diameter of said cylinder is smaller than that of said holder.

2. The high pressure fuel pump according to claim 1, wherein said seal unit comprises said seal holder fixed to an end of the holder on the cylinder side; and a seal element held in the holder by the seal holder.

3. The high pressure fuel pump according to claim 1, wherein the holder covers the end of the sliding portion to form a fuel reservoir at the end of the sliding portion of said cylinder and said plunger, the end of the sliding portion of said cylinder and said plunger faces the fuel reservoir, and an end of a fitting portion between the cylinder and the pump housing faces a pressurized chamber.

4. The high pressure fuel pump according to claim 3, wherein pressure in a low pressure passage of the pump acts on the fuel reservoir.

5. The high pressure fuel pump according to claim 1, wherein a spring is arranged to apply a spring force for reciprocating movement to the plunger and is held on the holder.

6. The high pressure fuel pump according to claim 1, wherein said seal unit comprises a gasoline seal and an oil seal, and a space is formed between the gasoline seal and the oil seal.

7. The high pressure fuel pump according to claim 1, wherein said seal unit comprises two mutually independent seal devices mounted with a specific spacing in a longitudinal direction from said end of the sliding portion of said cylinder and said plunger along a circumference of said plunger;

the two seal devices are held on the circumference of said plunger by said holder surrounding said end of the sliding portion of said cylinder and said plunger while keeping said specific spacing; and a fuel reservoir is formed between said end of the sliding portion and one of said seal devices mounted on a side of said end of the sliding portion, said fuel reservoir being in fluid communication with a suction chamber of said pump within said pump.

8. A high pressure fuel pump according to claim 7, further comprising a spacer for regulating said specific spacing mounted between said two seal devices.

9. A high pressure fuel pump according to claim 7, wherein the seal device on said cylinder side, of said two seal devices, has a fuel seal function, and the remaining seal device has a lubricant seal function.

10. A high pressure fuel pump according to claim 7, wherein there is provided in the cylinder a transverse hole by which the fuel leaked in the fuel reservoir is returned to the suction chamber of the said pump.

11. A high pressure fuel pump according to claim 8, wherein said spacer is made of aluminum.

12. The high pressure fuel pump according to claim 1, wherein said holder has a screw portion for threadedly engaging with a pump body and a cover portion for surrounding said sliding portion of the cylinder and plunger, said cylinder being mounted in said holder and being fixed to the pump housing by threadedly engaging the holder with the pump body;

said seal unit comprises two mutually independent seal devices mounted with a specific spacing in a longitudinal direction from said end of the sliding portion of said cylinder and said plunger along a circumference of said plunger;

the two seal devices are held on the circumference of said plunger by the cover portion of said holder while keeping the specific spacing; and a fuel reservoir is formed between said end of the sliding portion and one of said seal devices mounted on a side of said end of the sliding portion, said fuel reservoir being in fluid communication with a suction chamber of said pump within said pump.

13. A high pressure fuel pump according to claim 12, further comprising a spacer for regulating said specific spacing mounted between said two seal devices.

14. A high pressure fuel pump according to claim 12, wherein the seal device on said cylinder side, of said two seal devices, has a fuel seal function, and the remaining seal device has a lubricant seal function.

15. A high pressure fuel pump according to claim 12, wherein there is provided in the cylinder a transverse hole by which the fuel leaked in the fuel reservoir is returned to the suction chamber of the said pump.

16. A high pressure fuel pump according to claim 13, wherein said spacer is made of aluminum.

17. The high pressure fuel pump according to claim 1, wherein said plunger is configured for force-feeding fuel in a pressurization chamber, a suction valve is provided at an inlet of the pressurization chamber, a discharge valve is provided at an exit of the pressurization chamber, and a low pressure chamber is provided on an upstream side of the suction valve, wherein an annular member made of a resin is used in the seal unit located on a pressurization chamber side of said seal unit at two locations.

18. A high pressure fuel pump according to claim 17, wherein the seal on the opposite side to the pressurization chamber, of said seals at two locations, is a rubber annular structure.

19. The high pressure fuel pump according to claim 1, wherein a transverse hole is provided in the cylinder by which the fuel leaked from a pressurization chamber in which the plunger force-feeds fuel to a fuel reservoir formed on a pressurization chamber side of the seal unit through a clearance between said cylinder and said plunger is returned to an inlet port.

20. The high pressure fuel pump according to claim 1, wherein said seal unit comprises two seal portions mounted with a specific spacing in a longitudinal direction from said end of the sliding portion of said cylinder and said plunger along a circumference of said plunger;

a space in which the fuel and the lubricant coexist is provided between said two seal portions; and a fuel reservoir is formed between said end of the sliding portion and one of said seal portions mounted on a side of said end of the sliding portion, said fuel reservoir being in fluid communication with a suction chamber of said pump within said pump.

21. A high pressure fuel pump according to claim 20, further comprising a spacer for regulating the spacing, mounted between said two seal portions.

22. A high pressure fuel pump according to claim 20, wherein the seal portion on the cylinder side, of said two seal portions, has a fuel seal function, and the remaining seal portion has a lubricant seal function.

23. A high pressure fuel pump according to claim 20, wherein said seal portion on said cylinder side, of said two seal portions, is structured by a resin annular member.

24. A high pressure fuel pump according to claim 20, where the seal portion remote from said cylinder, of said two seal portions, is structured by a rubber annular member.

25. A high pressure fuel pump according to claim 20, wherein there is provided in the cylinder a transverse hole by which the fuel leaked in the fuel reservoir is returned to the suction chamber of the said pump.

26. A high pressure fuel pump according to claim 20, further comprising a spacer (344) provided along a circumference of said plunger in said space between said two seal portions.

27. A high pressure fuel pump according to claim 26, wherein said spacer is made of aluminum.

28. A high pressure fuel pump according to claim 26, further comprising a said holder (21) holds said two seal portions and said spacer provided therebetween, and wherein said two seal portions and said spacer are held between said holder (21) and said plunger (2) by said seal holder (305).

29. The high pressure fuel pump according to claim 1, wherein an annular groove is formed between sliding surfaces of the cylinder and the plunger, and the plunger is configured so that the plunger is projected beyond an end portion of the cylinder facing the pressurization chamber.

30. The high pressure fuel pump according to claim 29, wherein the suction valve and the discharge valve are mounted on the pump housing.

31. The high pressure fuel pump according to claim 29, wherein a seal mechanism comprising a fuel seal and an oil seal is mounted on an outer circumference of a portion of the plunger projected from an end portion of the cylinder opposite a pressurization chamber, and said end portion of the cylinder opposite the pressurization chamber is covered and isolated from atmosphere by said holder holding the fuel seal and the oil seal.

32. The high pressure fuel pump according to claim 30, wherein a seal mechanism comprising a fuel seal and an oil seal is mounted on an outer circumference of a portion of the plunger projected from an end portion of the cylinder opposite a pressurization chamber, and said end portion of the cylinder opposite a pressurization chamber is covered and isolated from atmosphere by said holder holding the fuel seal and the oil seal.

33. The high pressure fuel pump according to claim 31, wherein the fuel pump is structured so that a space formed between the seal mechanism and the end portion of the cylinder opposite the pressurization chamber becomes higher in pressure than atmospheric pressure and becomes an intermediate pressure between an inlet pressure of the suction valve and the pressure in the pressurization chamber.

34. The high pressure fuel pump according to claim 32, wherein the fuel pump is structured so that a space formed between the seal mechanism and the end portion of the cylinder opposite the pressurization chamber becomes higher in pressure than atmospheric pressure and becomes an intermediate pressure between an inlet pressure of the suction valve and the pressure in the pressurization chamber.

* * * * *

UNITED STATES PATENT AND TRADEMARK OFFICE

CERTIFICATE OF CORRECTION

PATENT NO. : 7,665,976 B2
APPLICATION NO. : 11/409062
DATED : February 23, 2010
INVENTOR(S) : Usui et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 532 days.

Signed and Sealed this

Twenty-eighth Day of December, 2010

David J. Kappos

*Director of the United States Patent and Trademark Office*